United States Patent
Abal

[19]
[11] Patent Number: 6,010,020
[45] Date of Patent: *Jan. 4, 2000

[54] MULTI-PANEL CARGO CONTAINER

[75] Inventor: Daniel M. Abal, San Diego, Calif.

[73] Assignee: Hyundai Precision America, Inc., San Diego, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/792,475

[22] Filed: Jan. 31, 1997

[51] Int. Cl.[7] .................................................. B65D 27/00
[52] U.S. Cl. ............................ 220/1.5; 296/181; 220/683
[58] Field of Search ........................... 220/1.5, 683, 692, 220/693; 296/181, 191

[56] References Cited

U.S. PATENT DOCUMENTS

| | | |
|---|---|---|
| 530,314 | 12/1894 | Williams .............................. 220/683 X |
| 2,872,240 | 2/1959 | Bennett . |
| 3,102,498 | 9/1963 | Dean . |
| 3,376,063 | 4/1968 | Hulverson . |
| 3,393,920 | 7/1968 | Ehrlich . |
| 4,015,876 | 4/1977 | Hulverson et al. . |
| 4,065,168 | 12/1977 | Gregg . |
| 4,357,047 | 11/1982 | Katz . |
| 4,685,721 | 8/1987 | Banerjea . |
| 4,810,027 | 3/1989 | Ehrlich . |
| 4,874,184 | 10/1989 | Boyer . |
| 4,904,017 | 2/1990 | Ehrlich . |
| 4,940,279 | 7/1990 | Abott et al. . |
| 5,004,269 | 4/1991 | Pelt . |
| 5,058,756 | 10/1991 | Green . |
| 5,066,066 | 11/1991 | Yurgevich et al. . |
| 5,112,099 | 5/1992 | Yurgevich et al. ..................... 296/181 |
| 5,195,800 | 3/1993 | Stafford et al. . |
| 5,286,079 | 2/1994 | Zubko et al. . |
| 5,433,501 | 7/1995 | Thomas et al. ......................... 296/191 |
| 5,439,266 | 8/1995 | Ehrlich . |
| 5,507,405 | 4/1996 | Thomas et al. ......................... 220/1.5 |
| 5,509,714 | 4/1996 | Schmidt . |
| 5,584,252 | 12/1996 | Smith et al. ........................ 296/181 X |

OTHER PUBLICATIONS

Great Dane, "Aluminum Plate Vans" (publication date not known).
Monon, "Super–Cube Plate Trailer" (1993).
"Monon Provides Cargo–Lok Logistic Trak" (publication date not known).
Trailmobile, "Can Haul Plate Trailer" (publication date not known).
Wabash, "Aluminum Plate Super Cube Vans" (publication date not known).
Stoughton, "Aluminym Plate Van, Model PVW Hi–Cube" (1994).
Pines, "4 Of the Many Reasons Why Pines Unique Plate Wall Trailer Design is Stronger . . . Performs Better . . . Lasts Longer" (publication date not known).

*Primary Examiner*—Steven Pollard
*Attorney, Agent, or Firm*—Baker & McKenzie

[57] ABSTRACT

A cargo container having joining members to join plural panels and a top rail assembly connecting the side panels to the roof of the container. In one embodiment the joining member defines a longitudinally elongated hollow core, which optionally is filled with structural foam. In another embodiment, the joining member receives a logistic insert having logistic slots. The top rail assembly has a longitudinally extended mounting flange for mounting the side panels. By angling the top rail, the container achieves a characteristic wedge-shaped side profile, while still using uniformly height dimensioned side panels.

26 Claims, 5 Drawing Sheets

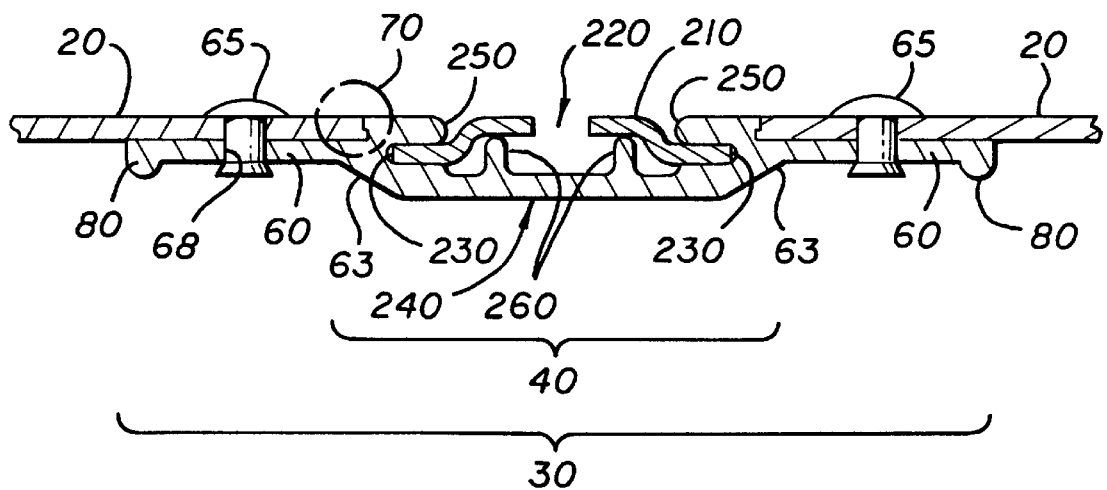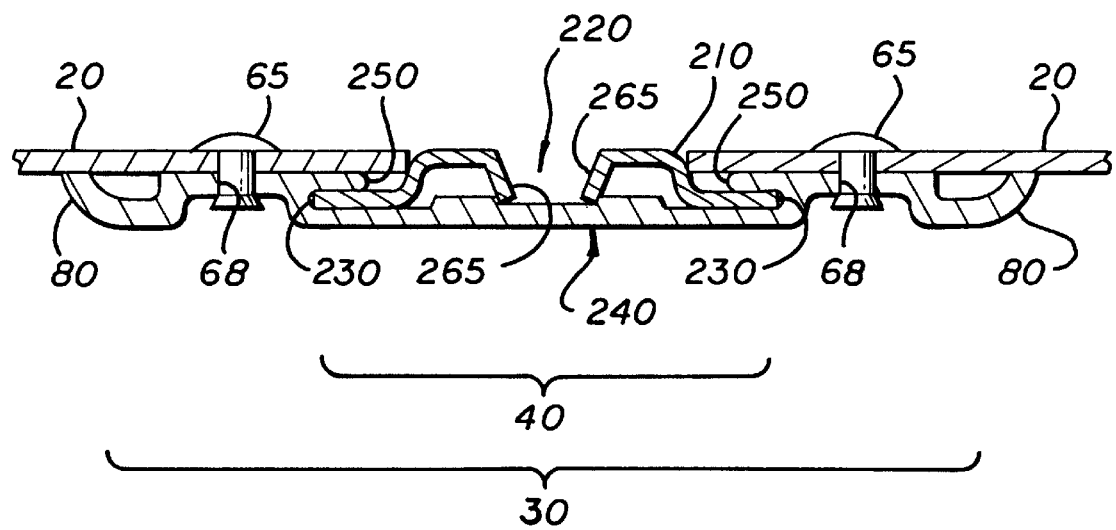

MULTI-PANEL CARGO CONTAINER

BACKGROUND OF THE INVENTION

The present invention relates to cargo containers and trailers (collectively "containers"), such as the type typically having plural panel sidewalls and a wedge-shaped side profile.

Various forms of trailers and other such containers used to transport cargo are known. Such containers may be used for transporting cargo by any of the numerous means of transportation, such as ships, rail and road. Various governmental regulations cover the preferred dimensions and structural standards for such trailers and containers. For example, in the United States, highway trailer width is limited by applicable highway regulations.

Known cargo containers typically have a top wall, a bottom wall, and two side walls, together forming a more or less rectangular box. One type of known cargo container has a wedge-shaped profile having a rear height dimension (i.e. longitudinal dimension) that is greater than that of the front. While at least one type of cargo container has employed walls made of uniform sheets of metallic material, difficulties in assembly and repair of such units has resulted in a variety of designs in which a number of panels are combined in some way to form the side walls.

Considerations common to typical such multi-panel designs include resistance to stress and shear at the joints, strength to weight ratio, component cost, ease of assembly, ability to exclude water and debris from the interior of the container, and uniformity of the interior surface of the container side walls.

In one typical container construction, the side walls are constructed of a plurality of generally planer panels. The side panels are connected by riveting adjacent panels to a connector posed placed between the two panels. Various forms of joining members are known having various shapes, weights, dimensions and performance properties. One such side known side post is relatively light, but has a relatively low resistance to bending, or torsional or buckling stresses. Another known side post has a higher resistance to bending and torsional and buckling stresses, but is also relatively heavy.

Given that the width of trailers typically is limited by governmental regulations, there is a need for connecting posts having reduced cross-sectional profiles, so as to allow for an increased interior space. However, in the known connecting post constructions, there generally is a trade-off between cross-sectional area and performance. There is also a need for a relatively lighter connecting post having better performance characteristics, such as improved bending and torsional properties.

One form of known connecting post is an insert-type post, having a logistic insert and a post body. The logistic insert includes apertures so as to receive various forms of logistic mounting devices. In a typical known construction, the insert is attached to the post body as the middle layer in a three layer construction formed by a plate, the insert and the post body, all joined by rivets. In this known construction, the insert often is formed of steel and the post body of aluminum. This suffers numerous disadvantages, including difficulty and expense of assembly in forming the three layer construction as well as differing rates of thermal expansion of the aluminum and steel components. Fastening the insert to the post body can result in distortions during temperature changes. A further disadvantage of the known three-layer construction is increased width, thereby reducing the interior space of the container.

Cargo containers also are known to be constructed with a wedge-shaped side profile—having a greater height in the rear than in the front of the trailer. This is commonly achieved by using side panels of varying heights (longitudinal dimensions), i.e. the panels used in the front are shorter than those used in the middle, which are in turn shorter than those used in the rear. In this known trailer, a top rail joins the roof of the trailer to the respective side walls at the left and right sides. The top rail slopes from a relatively higher level at the front to a lower level at the rear. In another known trailer, the bottom floor is sloped, leaving the roof at a uniform height.

SUMMARY OF THE INVENTION

The present invention alleviates to a great extent the disadvantages of the known cargo containers by providing a cargo container with sidewalls constructed of plural plates, joined using joining members having improved performance characteristics without an appreciable increase in weight or cross-sectional area.

The cargo container of the present invention includes a roof, floor, two sides, front and back, forming an enclosed, generally cubic or rectangular, space. Each side wall includes a plurality of panels joined using a longitudinally elongated joining member. In one embodiment, the joining member defines an interior central space. Laterally extending flanges extend from a central portion of the joining member providing mounting surfaces for the adjacent panels. In a preferred embodiment, a longitudinally extended relief indentation where the edge of a respective mounted panel is received.

In an alternative embodiment, the joining member has a first axial side facing the interior of the cargo container having receiving structures formed therein. A logistic insert is mounted to the joining member using the receiving structures. The insert preferably includes logistic slots to receive mounting clips and other forms of cargo loading/packing aids. The insert may be fixedly attached to the joining member.

The roof of the cargo container is joined one or both of the side walls using a laterally elongated top rail. The top rail extends along the junction between one of the side walls and the roof. The top rail includes a longitudinally elongated flange to which the panels and/or the joining members of the side wall are joined. The top rail preferably slopes so as to mount the roof in a sloping fashion. The flange also is preferably long enough to accommodate the slope as well as each of the panels. Preferably the panels have a uniform longitudinal dimension, so that there is a greater overlap of the flange and the respective panel in the front of the container, than there is between the flange and another respective panel in the rear of the container.

Each of the above-described features of the present invention can be combined with each other in any fashion, including combining each of the features together in a single cargo container.

BRIEF DESCRIPTION OF THE DRAWINGS

The above and other objects and advantages of the invention will be apparent upon consideration of the following detailed description taken in conjunction with the accompanying drawings in which like reference characters refer to like parts throughout and in which:

FIG. 5 is a cross-sectional view of an embodiment of the joining member of the present invention;

FIG. 6 is a cross-sectional view of an embodiment of the joining member of the present invention;

DETAILED DESCRIPTION OF THE INVENTION

Figure 1:
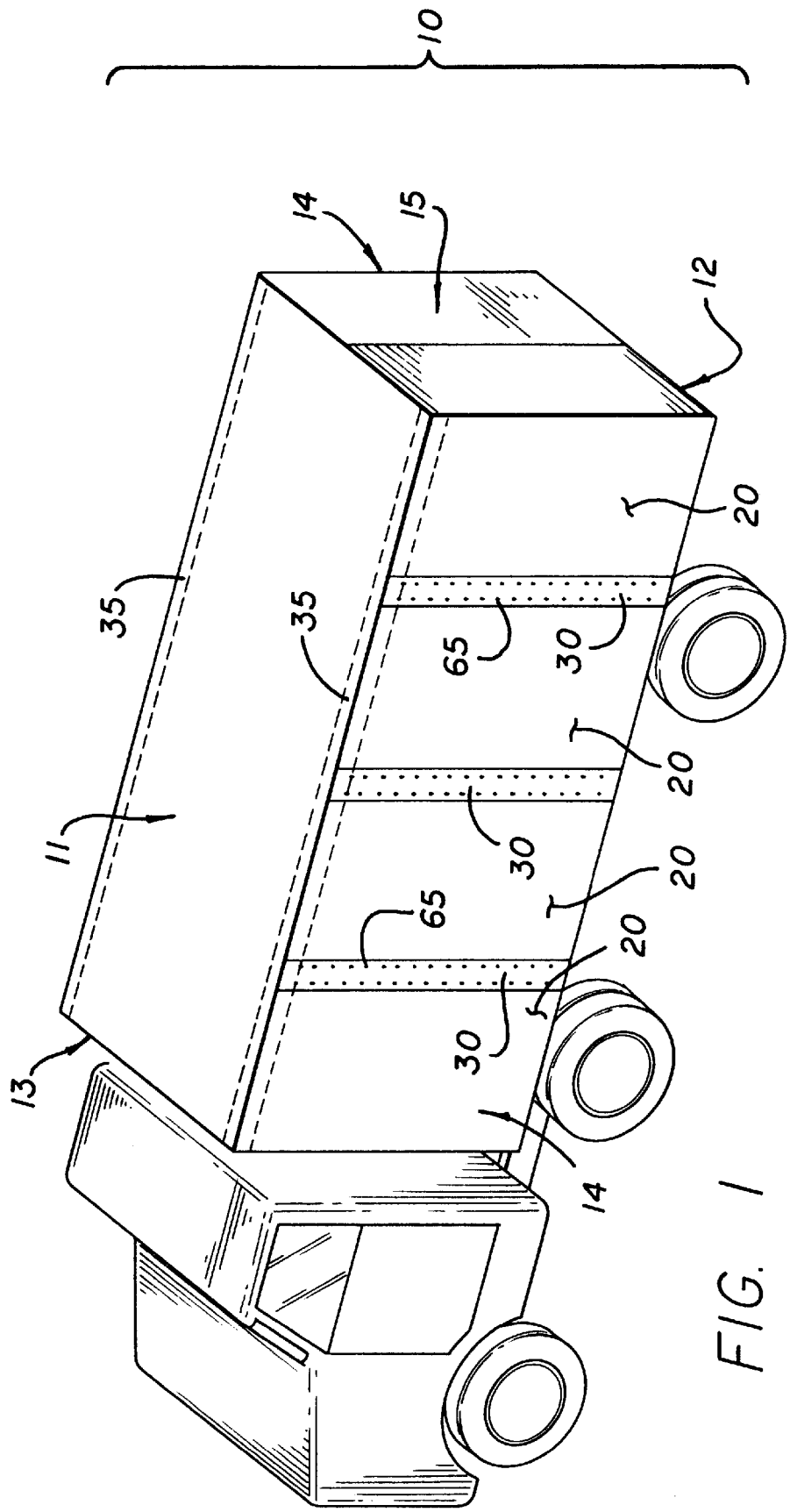
FIG. 1 is a perspective view of a container in accordance with the present invention.

FIG. 1 provides a perspective view of a cargo container 10 in accordance with the present invention. Any size container 10 may be used. The container 10 includes a roof 11, a floor 12, a front 13, two side walls 14 and a back 15. Each side 14 preferably includes a plurality of panels 20 that are joined to one another using joining members 30. The respective sides 14 are connected to the roof 11 via top rails 40.

The panels 20 may be constructed of any material, layered materials or composite having sufficient structural integrity to form the side walls 14. Such materials include wood, cellulose, aluminum or other metals, polymeric materials, structural foams, or any composite or layered construction thereof. In a preferred embodiment, each of the panels 20 used to form side walls 14 have the same height dimension, measured from the edge adjacent the floor 12 up to the edge adjacent the top 11. Use of such uniformly height dimensioned side walls simplify construction and reduce the costs as varying height side walls are not needed. The top rail 35 of the present invention, described more fully below, provides a construction allowing the use of such uniformly height dimensioned side walls in a wedge-shaped container. In the wedge-shaped container, the height of the front 13 is less than that of the back 15 and the roof 11 slopes upwards, from the front 13 to the back 15, providing wedge-shaped the side profile characteristic of such a container.

Figure 2:
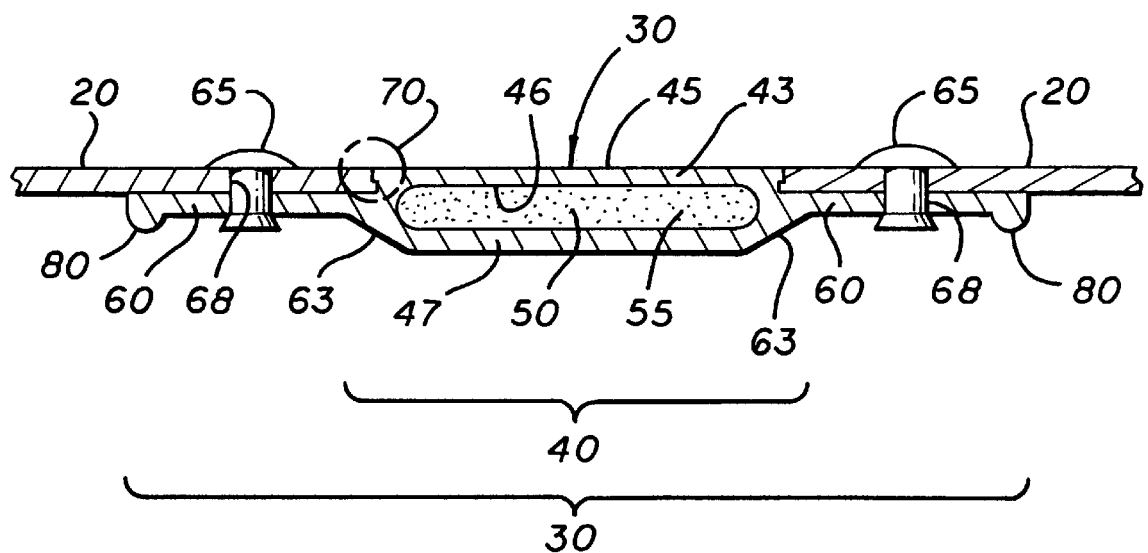
FIG. 2 is a cross-sectional view of a joining member in accordance with the present invention.

A cross-sectional view of a preferred, "tubular", embodiment of the joining member 30 is illustrated in FIG. 2. The joining member 30 is constructed of any material having sufficient strength to connect adjacent panels 20 and maintain the structural integrity of the container 10. For example, the post 30 may be constructed of metallic, cellulose or polymeric materials, or wood. Preferably it is constructed of an extruded aluminum. The post has a generally hollow center section 40 having axially displaced walls 43, 47. The inner wall 43 has a first face 45 facing the inside of container 10 and a second face 46 facing cavity 50. Preferably the first face 45 is flat so as to present a flat profile to the interior of the container 10. The outer wall 47 is axially displaced from the inner wall 43, defining a cavity 50 therebetween. The cavity 50 may optionally be filled with a structural foam 55 so as to provide increased strength. Alternatively, the wall thickness of the inner and outer walls 43, 47 can be decreased a constant strength achieved through the use of structural foam.

The joining member 30 includes laterally extended flange members 60, 60 providing mounting surfaces for mounting the panels 20, 20 to the joining member 30. The flange members 60, 60 extend laterally from respective opposite lateral sides 63, 63 of the center section 40. The panels 20 are connected to the flange members 60, using any form of fastening means. By way of example, rivets, bolts, screws, adhesives or any other fixing means may be used. Preferably, rivets 65 extend through apertures 68 in flange members 60 thereby mounting panels 20 to the respective flange members 60.

Figure 2A:
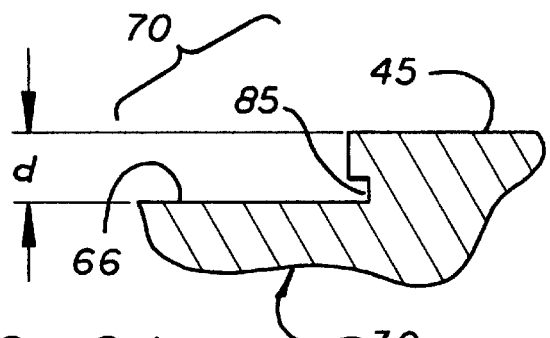
FIG. 2A is a detailed cross-sectional view of a notch section of the joining member illustrated in FIGS. 2 and 5.

It is preferred that the interior surfaces of container 10 be generally planer. This is desirable so as to decrease the possibility of catching cargo along the interior walls as well as protect any people or equipment in the loading process. Each flange member 60 preferably includes a generally planer first flange face 68 facing the interior of the container 10. The first flange face 68 of each flange 60 preferably is recessed with respect to the first face 45 of the inner wall 43 of center section 40, forming a notch section 70 where the first face 45 of the inner wall 43 is displaced towards the interior of container 10 from flange face 68. The notch section 70 is illustrated in detail in FIG. 2A. The first face 45 of the inner wall 43 is preferably displaced axially from the flange face 68 a distance ("d") equal to the thickness of the panel 20, although any amount of displacement may be selected. By selecting a displacement approximately equal to the thickness of panel 20, a smooth interior surface is formed running from panel 20 to inner wall 43 and to the second panel 20.

Any offset distance between the panels 20, 20 mounted to flanges 60, 60 on opposite sides of the inner wall 43 may be selected. One possible spacing is approximately 4 in., conforming with one known industry practice. In such an embodiment, the first face 45 of the inner wall 43 has a horizontal dimension of approximately 4 in. (i.e. the distance between the forward and rear notch sections on opposite sides of the first face 45), conforming to the known industry practice. It is preferred to reduce the spacing between the panels 20, 20, thereby making the panels more resistant to flexing, reducing moisture intrusion. In a preferred embodiment, the panels are spaced apart by approximately 2½ in., although smaller or larger spacings also may be used.

In a preferred embodiment, the notch section 70 includes a longitudinally extended relief indentation 85 to accommodate burrs or other manufacturing defects along the edge of panel 20 which fits into the notch section 70. In addition, the external surface of flange section 60 terminates in a bulb 80 in one embodiment. The bulb 80 is thicker axially than the remainder of the flange. Such a thickening towards the distal ends of the flange sections 60, provides increased structural strength and resistance to bending.

All of the sections of the joining member 30 preferably are integrally formed so that the joining member forms a unitary piece. For example, the center section 40, flanges 60, 60 and bulbs 80, 80 are all integrally formed.

Figure 4:
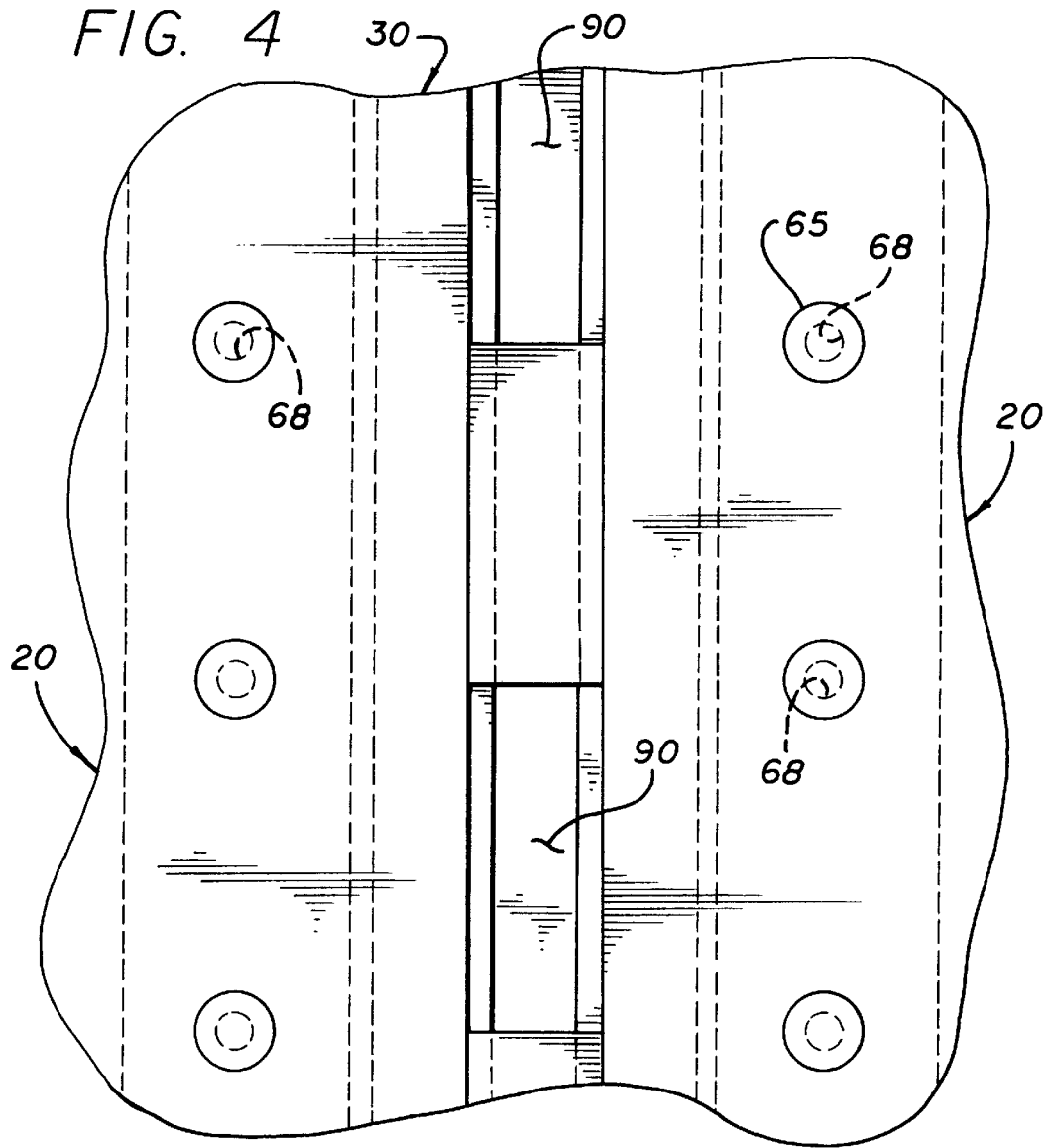
FIG. 4 is a fragmentary view of the inside face of the joining member and side wall illustrated in FIG. 3, as viewed from the inside of a container in accordance with the present invention.
Figure 3:
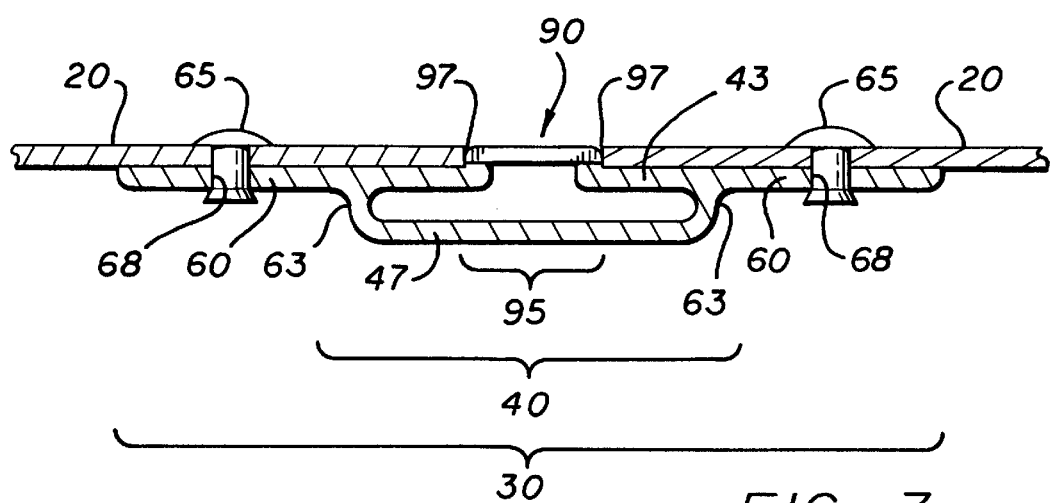
FIG. 3 is a cross-sectional view of an embodiment of the joining member and plate side wall in accordance with the present invention.

An alternative embodiment of a joining member 30 is shown in FIGS. 3 and 4. In this embodiment, the inner wall 43 of the center section 40 defines logistic slots 90. Plural logistic slots 90 preferably are provided, spaced vertically along the longitudinal dimension of the joining member 30. These slots 90 can be any shape or size for receiving any type of mounting aids. Such mounting aids such as hooks, rings, straps, ties, straps or netting may be used to secure cargo or aid in the loading or unloading of cargo. For example, in the preferred embodiment, slots 90 are dimensioned so as to accommodate standard "A" type mounting logistics. In this embodiment, the displacement of walls 43 and 47 preferably is large enough so as to accommodate standard mounting clips therebetween.

In the embodiment illustrated in FIG. 4, the inner wall 43 of the center section 40 has a central portion 95 which is axially displaced towards the interior of container 10 from the remainder of the inner wall 43, forming a notch section 97 where the central portion 95 is displaced towards the interior from the remainder of the inner wall 43. Preferably the logistic slots 90 are formed in the central portion 95. Preferably each of sections of the joining member 30 in the embodiment depicted in FIGS. 3 and 4 are integrally formed.

A further embodiment of a joining member 30 is illustrated in FIGS. 5 and 6. The post 30 has an insert 210, preferably having a plurality of vertically spaced logistic slots 220 formed therein. This insert may be formed of any suitable material, such as any suitably strong metal, polymer, wood or cellulose material. Preferably the insert is formed of a metal, such as aluminum or steel. The insert 210 may be formed using any suitable method, for example, by extrusion, with the logistic slots 220 formed by punching the extruded material. By way of a other examples, the insert 220 may be made from cut and bent sheet material or roll formed metal. The main body of the joining member 30, i.e. the receiving member 240 (i.e. the mounting structure) preferably defines a generally open center section 40 receiving the insert 210. The center section includes receiving slots 230 into which the insert is placed. Edges 250 of slots 230 preferably are rounded so as to reduce the likelihood of catching materials placed or moved near it. The open center section 40, also preferably includes protrusions 260 that provide support to the insert 210. Alternatively, the insert 210 may have axially extending protrusions 265 (shown in FIG. 6) providing such support. In a preferred embodiment, the insert 30 is fixedly attached to the mounting structure. Any type of adhesive, binding material or fastening means may be used. For example, glue, acrylic, epoxy, epoxy-sulphide, caulking or other adhesives may be used, or screws, rivets, nails, etc. may be used.

The apertures 68 for receiving fastening means 68 are offset on the flanges 60, away from the center section 40 and away from the mounting slots 230. The plates 20 are fastened to the joining member 30 on the extended flange members 60 using the fastening means 65. As previously described, any fastening means may be used. By avoiding an overlap between the apertures 65 and the insert 210, the insert is not fastened to the plates 20, avoiding a three-layer sandwich construction. The insert 210 may be separately fastened to the joining member 30 using any of the known fastening means. Preferably, the insert 210 is fastened to the joining member 30 using an adhesive to bind the insert 210 to the internal surfaces of slots 230. Alternatively, the insert 210 may be left unfastened to the joining member 30. Preferably all of the sections of the joining members 30 illustrated in FIGS. 5 and 6 are integrally formed, with the exception of the insert 210, which preferably is separately formed.

Figure 7:
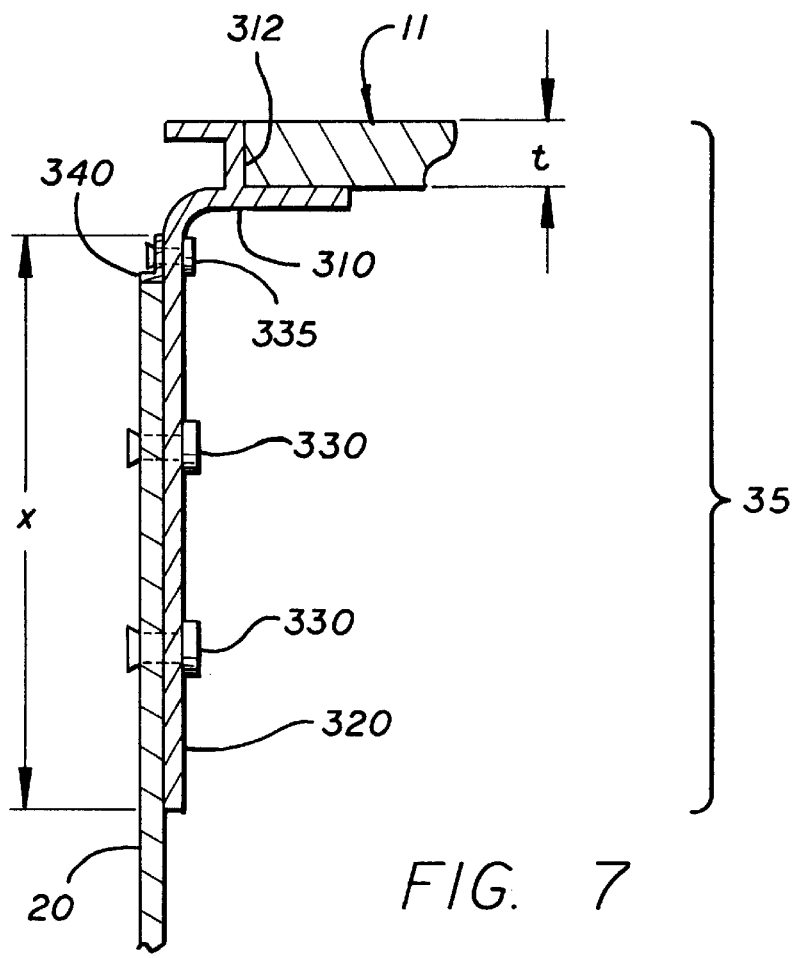
FIG. 7 is a cross-sectional view of a top rail in accordance with the present invention.

FIG. 7 illustrates a preferred top rail 35 for attaching the plates 20 to the roof 11. The top rail 35 includes a mounting strip 310 for receiving the roof 11. The roof preferably is attached to the top rail by any known fastening apparatus or substance, such as rivets, nails, screws or adhesives. Alternatively, a movable roof may be used. For example, the roof may be on rollers so as to expose a portion of, or the entirety of, the interior of the container 10. The top rail 40 includes a notch 312 having longitudinal depth "t" to accommodate the roof 11. Preferably the longitudinal depth "t" is approximately the same as the width of the roof.

The top rail also includes a downwardly extending rail flange 320. At least a portion of the top rail flange 320 overlaps with each panel 20, providing a surface for mounting the top rail to each respective panel 20. Any known fastening means or substance may be used for mounting the top rail flange 320 to the respective side panel 20, as described above with respect to flange 60. Preferably two rivets 330 are used. Alternatively, a mounting bracket (not illustrated) may be used. The top rail 35 preferably also includes a cover member 340 which protrudes out of the exterior surface of the flange 320, so as to cover the top edges of the panels 20, for example reducing the amount of moisture intrusion. The cover member 340 may be attached to the top rail 35 by any known way, such as using a rivets 335, adhesives or being integrally formed.

Figure 8:
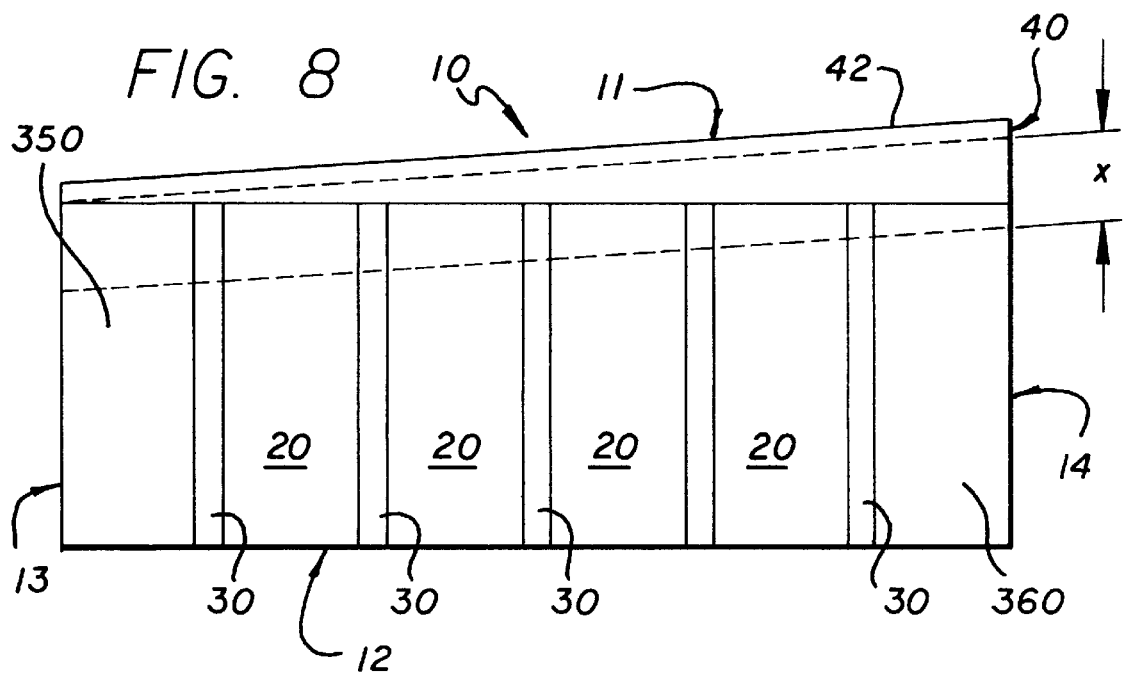
FIG. 8 is a side view of a cargo container showing a top rail and top rail flange (partially hidden) in accordance with the present invention.

The rail flange 320 preferably is dimensioned to be sufficiently elongated in the longitudinal so as to accommodate a preferred wedge-shaped construction, as illustrated in FIG. 8. In the wedge-shaped construction, the longitudinal distance from the floor 12 of the container 10 to the roof is shorter in the front 13 than in the rear 14 of the container. In this construction, the top rail 35 is angled from a longitudinal lower height in the front 13 to a greater longitudinal height in the back 14. If uniformly longitudinally dimensioned panels 20 are used, as illustrated in FIG. 8, there is a greater overlap of the top rail flange 40 with the panels 20 towards the front 13 of the container, than in the rear 14 of the container. As illustrated in FIG. 8, exemplary panel 350 in the front of the container 10 has a greater overlap with top rail flange 40, than exemplary panel 360, which is in the rear of the container 14. The top rail flange preferably has a longitudinal dimension "x" which is at least as long as the distance between the top side 42 of the top rail 40 and the top of the rearmost panel 360 of the container 10. Preferably the various sections of each top rail 40 are integrally formed, making a unitary member.

The following example discusses the physical properties of a joining member in accordance with the invention:

EXAMPLE

A joining member having the structure illustrated in FIG. 2 was constructed using 6061-T6 extruded aluminum. The cross sectional area of the joining member (including the structural area, but not the area occupied by the cavity 30) was approximately 1.13 in.$^2$, the total weight of the post was approximately 11.9 lbs. and the weight per foot length of the post was approximately 1.31 lbs./ft. Various bending and torsion properties were measured. The yield strength/weight ratio was calculated to be approximately 304 in.-lb./lb. where the strength was measured by performing a three-point bending test, applying a load at approximately the center of the member tested and measuring the load applied when the member began yielding. The bending stiffness/weight ratio was calculated to be 18,800 in.$^2$.

Thus, it is seen that a cargo container is provided. One skilled in the art will appreciate that the present invention can be practiced by other than the preferred embodiments which are presented herein for purposes of illustration and not of limitation, and the present invention is limited only by the claims which follow.

What is claimed is:

1. A longitudinally elongated joining member for joining adjacent generally planar panels in a cargo container, the cargo container having a plurality of walls defining an interior area, at least one of the walls being a panel wall including at least two spaced apart panels with the panels having a gap therebetween and the joining member together forming a generally smooth interior wall, the joining member comprising:
a longitudinally elongated center section member defining an interior cavity, the center section including a first lateral side, a second lateral side, and a longitudinally elongated first wall, the first wall having:
a first side facing the interior cavity; and
a substantially planar second side opposite the first side, at least a portion of the substantially planar second side extending into and substantially filling said gap and thus forming a portion of one of the panel walls defining the generally smooth interior wall of the container;
a first longitudinally elongated flange member laterally extending from the first lateral side of the center section; and
a second longitudinally elongated flange member laterally extending from the second lateral side of the center section,
said center section extending into and substantially filling said gap, thus forming said generally smooth interior wall.

2. The joining member of claim 1 wherein the center section further comprises a first lateral side and a second lateral side, the first and second longitudinally elongated flange members being integrally formed with the center section.

3. The joining member of claim 1 further comprising a structural foam loaded within the interior cavity.

4. The joining member of claim 1 wherein the each of the first and second longitudinally elongated flange members comprises:
a generally planar and longitudinally elongated mounting surface for receiving the generally planar panels joined together using the joining member.

5. The joining member of claim 4 wherein each of the respective flange members includes a bulb section laterally opposite the center section, the bulb section having an axial width that is greater than the axial width of the remainder of the respective flange member, contributing to structural strength of the flange member.

6. The joining member of claim 1 wherein:
each respective mounting surface of each of the first and second longitudinally elongated flange members is axially displaced from the second side of the first wall; and
the joining member further comprises a notch means at the intersection of the mounting surface of the first elongated flange member and the first lateral side of center section.

7. The joining member of claim 1 wherein each of the respective flange members defines a plurality of longitudinally separated apertures for receiving fastening means for fastening a panel to the flange member.

8. The joining member of claim 1 wherein the first wall defines a plurality of longitudinally separated apertures.

9. The joining member of claim 1 wherein the first wall defines a plurality of longitudinally separated logistic receivers.

10. A longitudinally elongated joining member for joining adjacent generally planar panels in a cargo container with the generally planar panels and the joining member together forming a generally smooth interior wall, the cargo container having a plurality of walls defining an interior area, the joining member comprising:
a center section having a first lateral side and a second lateral side opposite the first lateral side, the center section including longitudinally elongated first and second walls defining a cavity therebetween, the first wall including:
a first side facing the interior of the cavity defined between the first and second walls; and
a second side opposite the first face including an axially extended central face portion forming a portion of one of the walls forming the interior of the container;
the joining member further comprising:
a first longitudinally elongated flange member integrally formed with and laterally extending from the first lateral side of the center section; and
a second longitudinally elongated flange member integrally formed with and laterally extending from the second lateral side of the center section.

11. The joining member of claim 10 wherein the axially extended central face portion defines a plurality of longitudinally separated apertures.

12. A longitudinally elongated joining member for joining adjacent generally planar panels in a cargo container defining an interior area, the joining member comprising:
a discrete longitudinally extended mounting structure having:
a first axial side facing the interior of the cargo container;
a second side on the opposite axial side of the mounting structure from the first side, the second axial side having receiving members integrally formed thereon, the receiving members each having a respective receiving member axial side facing the interior of the cargo container; and
a longitudinally elongated insert having a plurality of longitudinally spaced logistic slots defined therein and having an axial insert side facing the interior of the cargo container wherein the receiving member axial sides and the insert axial sides extending generally the same axial distance into the interior of the cargo container, filling said gap, whereby together they form a generally planar surface facing the interior of the cargo container,
the insert being mounted to mounting structure with the integrally formed receiving members, and
the insert and the second side defining a longitudinally elongated cavity therebetween.

13. The joining member of claim 12 wherein each of the respective flange members defines a plurality of longitudinally separated apertures for receiving fastening means for fastening a panel to the flange member.

14. The joining member of claim 12 wherein the receiving members integrally formed with the mounting structure have longitudinally extended rounded edges.

15. The joining member of claim 12 wherein the portion of the second side of the mounting structure which is opposite the insert has at least one axially extending protrusion providing support for the insert.

16. The joining member of claim 12 further comprising an adhesive connecting the insert to the mounting structure.

17. The joining member of claim 16, wherein the adhesive is selected from the class consisting of acrylic, epoxy, or epoxy-sulphide.

18. The joining member of claim 13 wherein the each of the first and second longitudinally elongated flange members comprises:

a generally planar and longitudinally elongated mounting surface for receiving the generally planar panels joined together using the joining member.

19. The joining member of claim 18 wherein each of the respective flange members includes a bulb section laterally opposite the center section, the bulb section having an axial width that is greater than the axial width of the remainder of the respective flange member, contributing to structural strength of the flange member.

20. A joining member for joining an adjacent pair of plates on a side of a cargo carrier, the joining member comprising:
an attachment piece and an insert piece,
said attachment piece having an inner surface, an outer surface, a center portion and two arms extending outward from the center portion,
each of said arms having a proximal and a distal end, respectively, relative to said center portion,
said distal end of each of said arms terminating in a bulb extending from the outer surface,
said proximal end of each of said arms terminating in a lip, said lip projecting towards the center portion and forming a space or groove between the inner surface of the center portion and the arm,
a pair of flanges extending in a substantially perpendicular plane from the inner surface of said center portion,
each of said flanges terminating at a position substantially parallel with the inner surface of said arms,
said inner piece having an inner surface, an outer surface, a raised center portion and two arms extending in a curvilinear fashion away from the center portion and terminating in a position substantially parallel with one another,
said outer surface of said arms of said insert disposed within said grooves of said attachment piece such that said center portion of said insert is in a substantially parallel plane with said inner surface of said lip of said attachment piece and said inner surface of said center portion of said attachment piece and outer surface of said center portion of said insert cooperate to form a chamber.

21. A cargo container defining an interior area comprising:
a roof;
a bottom wall positioned under the roof;
two axially spaced and generally parallel opposing side walls forming a generally smooth interior wall extending longitudinally between the roof and the bottom wall, at least one of the side walls comprising:
a plurality of longitudinally and laterally extending spaced apart co-planar panels having a gap therebetween;
a plurality of joining members joining the adjacent edges of each adjacent pair of co-planar panels forming the side wall;
a portion of each said joining member extending into and substantially filling said gap, thus forming said generally smooth interior wall;
an elongated top rail joining said at least one of the side walls to the roof wherein the top rail extends laterally along the junction between said at least one of the side walls and the roof, the top rail including:
a longitudinally extending and laterally elongated flange member having a top and a bottom, a longitudinal dimension being defined as the distance between the top of the flange member and the bottom, wherein the longitudinal dimension of the elongated flange is relatively uniform along the entire lateral length of the flange member, the flange member having:
a first side and a second side, the first side of the flange member facing the interior of the cargo container; and
wherein the top rail is joined to each of the co-planar panels of the at least one of the side walls is attached to at least one of sides of the flange member; and
wherein the bottom wall of the cargo container is generally parallel to the ground, while the top rail is angled with respect to the bottom wall wherein the flange member joins the top rail to said at least one of the side walls at its flange member, the top of the flange member being closer to a top edge of said at least one of the side walls at the front end of the cargo container than it is at the rear end of the cargo container, thereby mounting the roof in a sloping fashion.

22. The cargo container of claim 21 wherein:
each of the co-planar panels forming the at least one of the side walls has substantially equal longitudinal dimensions; and
the longitudinal dimension of the flange of the top rail is sufficiently large so as to mount each of the co-planar panels to the flange, but at varying longitudinal positions on the flange.

23. The cargo container of claim 21 wherein:
both of the side walls comprise:
a plurality of longitudinally and laterally extending co-planar panels;
a plurality of joining members joining the adjacent edges of each adjacent pair of co-planar panels forming the side wall;
two elongated top rails, each one joining one of the side walls to the roof wherein both of the top rails extend laterally along the junction between the respective side wall and the roof, each top rail including:
a longitudinally extending and laterally elongated flange member, wherein the longitudinal dimension of the elongated flange is relatively uniform along the entire lateral length of the flange member, the flange member having:
a first side and a second side, the first side of the flange member facing the interior of the cargo container; and
wherein each of the co-planar panels of the at least one of the side walls is attached to at least one of sides of the flange member.

24. The cargo container of claim 21 wherein:
the cargo container includes a rear end;
the top rail has a top side opposite the longitudinally extending and laterally elongated flange member;
the at least one side wall comprises a plurality of panels, including a rearmost panel having a top edge; and
the longitudinal length of the longitudinally extending and laterally elongated flange member of the top rail is at least as long as the longitudinal distance from the top of the top side of the top rail to the top edge of the rearmost panel at the rear end of the cargo container.

25. A longitudinally elongated joining means for joining adjacent generally planar spaced apart panels having a gap therebetween in a cargo container, the cargo container having a plurality of walls defining an interior area, the generally planar panels and the joining member together forming a generally smooth interior wall the joining member comprising:

a center section means having a first lateral side and a second lateral side opposite the first lateral side, including a first elongated wall means and a second elongated wall means for defining an elongated cavity therebetween;

a portion of said center section extending into and substantially filling said gap, thus forming said generally smooth interior wall;

a first longitudinally elongated flange member integrally formed with and laterally extending from the first lateral side of the center section; and a second longitudinally elongated flange member integrally formed with and laterally extending from the second lateral side of the center section.

26. The joining member of claim 12 wherein the receiving members comprise means for freely retaining the elongated insert.

* * * * *